United States Patent
Lin et al.

(10) Patent No.: US 11,320,598 B2
(45) Date of Patent: May 3, 2022

(54) OPTICAL DEMULTIPLEXER WITH TRUNCATED PROFILE AND AN OPTICAL TRANSCEIVER MODULE IMPLEMENTING SAME

(71) Applicant: Applied Optoelectronics, Inc., Sugar Land, TX (US)

(72) Inventors: Kai-Sheng Lin, Sugar Land, TX (US); Hao-Chiang Cheng, Houston, TX (US); Ziliang Cai, Richmond, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 16/693,364

(22) Filed: Nov. 24, 2019

(65) Prior Publication Data
US 2021/0157058 A1 May 27, 2021

(51) Int. Cl.
| | |
|---|---|
| *G02B 6/12* | (2006.01) |
| *G02B 6/42* | (2006.01) |
| *G02B 6/35* | (2006.01) |
| *G02B 6/125* | (2006.01) |
| *H04B 10/40* | (2013.01) |

(52) U.S. Cl.
CPC .......... *G02B 6/3502* (2013.01); *G02B 6/125* (2013.01); *G02B 6/12007* (2013.01); *H04B 10/40* (2013.01)

(58) Field of Classification Search
None
See application file for complete search history.

(56) References Cited

U.S. PATENT DOCUMENTS

| | | | | |
|---|---|---|---|---|
| 6,549,696 | B1 * | 4/2003 | Uetsuka ............ | G02B 6/12014 385/24 |
| 6,813,415 | B2 * | 11/2004 | Tabuchi ............ | G02B 6/12011 385/24 |
| 2001/0033715 | A1 * | 10/2001 | Delisle ............. | G02B 6/12004 385/37 |
| 2003/0228105 | A1 * | 12/2003 | Tabuchi ............ | G02B 6/12011 385/37 |

(Continued)

FOREIGN PATENT DOCUMENTS

| | | | | |
|---|---|---|---|---|
| CN | 201583684 U | * | 9/2010 | ............ G02B 6/34 |
| CN | 207965210 U | * | 10/2018 | |
| KR | 2005014425 A | * | 2/2005 | ......... G02B 6/12019 |

*Primary Examiner* — Michelle R Connelly
(74) *Attorney, Agent, or Firm* — Grossman Tucker Perreault & Pfleger, PLLC; Norman S. Kinsella (57) ABSTRACT

The present disclosure is generally directed to an optical demultiplexer for use in an optical transceiver module having a truncated profile/shape to increase tolerance and accommodate adjacent optical components. In more detail, the optical demultiplexer comprises a body with at least one truncated corner at the input end. The at least one truncated corner allows the optical demultiplexer to be disposed/mounted, e.g., directly, on a densely populated transceiver substrate, e.g., a printed circuit board (PBC), and provide additional tolerance/space for mounting of circuitry and/or components within the region that would normally be occupied by corner(s) of the optical demultiplexer body. The at least one truncated corner may be introduced in a post-production step, e.g., via cut & polishing, or introduced during formation of the optical demultiplexer using, for instance, photolithography techniques.

18 Claims, 6 Drawing Sheets

(56) References Cited

U.S. PATENT DOCUMENTS

| | | | |
|---|---|---|---|
| 2004/0208417 A1* | 10/2004 | Purchase | G02B 6/12014 385/14 |
| 2012/0087620 A1* | 4/2012 | Pardo | G02B 6/12019 385/14 |
| 2013/0011095 A1* | 1/2013 | Ishii | G02B 6/12033 385/14 |
| 2013/0308904 A1* | 11/2013 | McGinnis | G02B 6/12014 385/37 |
| 2014/0169389 A1* | 6/2014 | Kim | G02B 6/4214 370/536 |
| 2015/0309257 A1* | 10/2015 | Huang | G02B 6/12026 385/14 |
| 2016/0097899 A1* | 4/2016 | Lin | G02B 6/4239 385/14 |
| 2017/0168252 A1* | 6/2017 | Pezeshki | G02B 6/428 |
| 2017/0307819 A1* | 10/2017 | Ho | H04B 10/40 |
| 2018/0091250 A1* | 3/2018 | Soldano | G02B 6/30 |
| 2020/0012055 A1* | 1/2020 | Ye | G02B 6/4214 |

* cited by examiner

OPTICAL DEMULTIPLEXER WITH TRUNCATED PROFILE AND AN OPTICAL TRANSCEIVER MODULE IMPLEMENTING SAME

TECHNICAL FIELD

The present disclosure relates to optical communications, and more particularly, to an optical demultiplexer, such as an arrayed waveguide grating (AWG), with a truncated profile/ shape to increase tolerance and accommodate adjacent optical components.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher transmit/receive speeds in increasingly space-constrained optical transceiver modules has presented challenges, for example, with respect to thermal management, insertion loss, RF driving signal quality and manufacturing yield.

The data center market for optical transceivers continues to grow, as well as increased demand in ever-increasing transmission speeds. Recent standards have now enabled wide-spread development of optical transmitters and transceivers capable of reaching speeds of 400 Gb/s (commonly known as 400G). Transceiver modules continue to scale to meet market demand, but such scaling raises significant design and manufacturing challenges.

BRIEF DESCRIPTION OF THE DRAWINGS

These and other features and advantages will be better understood by reading the following detailed description, taken together with the drawings wherein.

DETAILED DESCRIPTION

The present disclosure is generally directed to an optical demultiplexer for use in an optical transceiver module having a truncated profile/shape to increase tolerance and accommodate adjacent optical components. In more detail, the optical demultiplexer comprises a body with at least one truncated corner at the input end. The at least one truncated corner allows the optical demultiplexer to be disposed/ mounted, e.g., directly, on a densely populated transceiver substrate, e.g., a printed circuit board (PBC), and provide additional tolerance/space for mounting of circuitry and/or components within the region that would normally be occupied by corner(s) of the optical demultiplexer body. The at least one truncated corner may be introduced in a post-production step, e.g., via cut & polishing, or introduced during formation of the optical demultiplexer using, for instance, photolithography techniques.

In accordance with an embodiment, the optical demultiplexer comprises an arrayed waveguide grating (AWG) having a body that extends from an input end to an output end, with a plurality of arrayed waveguide gratings extending therebetween. The arrayed waveguide gratings may also be referred to herein as simply optical waveguides. The input end is configured to receive a multiplexed optical signal, e.g., from an external receive (RX) fiber, and launch the same on to the plurality of arrayed waveguide gratings. Accordingly, the input end may also be generally referred to herein as an optical coupling end, input coupling end, or simply an input region. The plurality of arrayed waveguide gratings separate constituent channel wavelengths and output each via a corresponding output port of the optical output end for detection purposes. The output end may also be generally referred to herein as an output port, a output coupling end, or simply an output region. The input end of the body includes at least one truncated corner, with the at least one truncated corner defining a tapered region that extends along the longitudinal axis of the body. The input end can include multiple truncated corners depending on a desired configuration. The truncated corners may be formed as, for instance, chamfers although other profiles are within the scope of this disclosure.

An optical demultiplexer of the present disclosure may be implemented as an AWG device using, for example, PLC techniques or other suitable formation processes. In an embodiment, the AWG device is formed on a substrate such as a silicon wafer or any other suitable substrate, and may include depositing sequential layers of cladding and core material thereon. In an embodiment, the cladding layer may comprise silicon (Si) and the core material may comprise silicon dioxide ($SiO_2$), also known as Silica. However, other cladding and core materials may be used and are also within the scope of this disclosure. The formed AWG device may then form essentially a monolithic structure and provide a PLC configured to de-multiplex a wavelength division multiplexed (WDM) signal into multiple different channel wavelengths for output to associated detectors.

The formed AWG device can include a plurality of sidewalls that extend longitudinally from a first end to a second end, with the plurality of sidewalls being formed at least in part by the cladding material. The first end of the AWG device may be configured to optically couple with an input fiber to provide the input coupling end, and a portion proximate to the second end of the AWG device may be configured to provide the output coupling end to optically couple with a plurality of detector devices.

The input coupling end of the AWG device may be coupled to, for example, an LC connector receptacle or other suitable connector receptacle. The connector receptacle may be coupled to the AWG device by, for example, an adhesive or other suitable approach. The input end may be configured with a surface that is angled at about 8 degrees for the purposes of reducing back reflection of an optical signal launched into the AWG device by an associated input fiber. At least one corner of the AWG device may be formed or otherwise modified such that a truncated profile gets formed. The present disclosure has identified that the input end of an AWG device can be modified to include at least one truncated corner without impacting optical performance. As discussed in further detail below, the input region/end, optical waveguide gratings, and output end/region can be optionally disposed/patterned in an offset configuration to allow for truncation of corner(s) of the body without impacting optical performance.

The output coupling end of the AWG device can include output waveguides or output channels comprising core materials that are configured to substantially confine light, e.g., at least 80 percent of incident light, along a first light path that extends longitudinally towards a substantially reflective surface. The substantially reflective surface may be provided by a portion of the output coupling end that includes a tapered region. As generally referred to herein, the term substantially reflective refers to a surface capable of reflecting at least 80 percent of incident light. The tapered region may be formed by cutting away and polishing a portion of the AWG chip such that an angled surface is formed, although other approaches to providing the tapered region will be apparent. The core material may have an index of refraction different from that of the medium adjacent to the AWG chip, such as air. Thus, and in accordance with Snell's law, light traveling via the longitudinal path provided by the output waveguides can encounter the angled surface and substantially reflect along a second light path, with the second light path being generally orthogonal to the first light path. The particular amount of light reflected by the angled surface can be about 80% or more. Light along the second light path can encounter a sidewall of the AWG chip and be emitted therefrom towards detector devices. The surface of the sidewall region that emits the light away from the AWG device may be accurately described as an output interface or a direct coupling interface.

Detector devices such as a photodiode may be disposed in a manner that aligns light-sensitive regions of the same with the direct coupling interface of the AWG device. A detector device may be provided for each channel output such that each channel wavelength is received and detected by an associated detector. Each detector device may be configured to detect channel wavelengths and provide the same to associated circuitry for amplification and conversion to electrical signaling. The detector devices may be disposed a distance D from the direct coupling interface of the AWG device in order to reduce the potential of damage to the detector devices and/or the AWG device when, for example, shifting/moving the ROSA components during active alignment procedures. Active alignment procedures can be conducted during manufacturing by providing a test WDM signal into the AWG device and monitoring the optical power of the signals received by the detectors, moving components (e.g., the AWG device and/or the detectors) and retesting. Thus the potential for damage may be reduced by providing a small gap between the AWG device and detector devices. In some cases, a material such as a gel may be inserted between the AWG device and detector devices. The index of refraction for the material may be about 1.0 or other suitable index that allows light to pass into the detector devices. In other cases, the detector devices may be disposed directly on the surface of the AWG chip forming the direct coupling interface.

A transceiver module having an optical demultiplexer consistent with the present disclosure advantageously allows for on-board placement of an optical demultiplexer on a transceiver substrate, e.g., to provide a compact footprint and simplify trace routing, while having a body profile that reduces an overall footprint to increase space for surface mount traces and/or components on a transceiver substrate. Thus, an optical waveguide consistent with the present disclosure avoids the necessity of external coupling, e.g., via interconnect devices and/or intermediate waveguides to couple to a transceiver module, and minimizes or otherwise reduces the overall footprint of an optical demultiplexer.

As used herein, "on-board" in the context of a ROSA arrangement includes direct or indirect coupling of ROSA components to a common substrate. The components of the ROSA arrangement may be coupled to the same surface, or different surfaces of the same substrate. Likewise, the TOSA components may be coupled to the same or different surfaces of the substrate.

Although the following disclosure illustrates and describes various aspects and embodiments directed to optical demultiplexers with truncated profiles within the context of ROSAs, optical demultiplexers consistent with the present disclosure may also be utilized within other optical subassemblies such as TOSAs.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated characteristic. To provide one non-limiting numerical example to quantify "substantially," minor variation may cause a deviation of up to and including ±5% from a particular stated quality/characteristic unless otherwise provided by the present disclosure.

Figure 1:
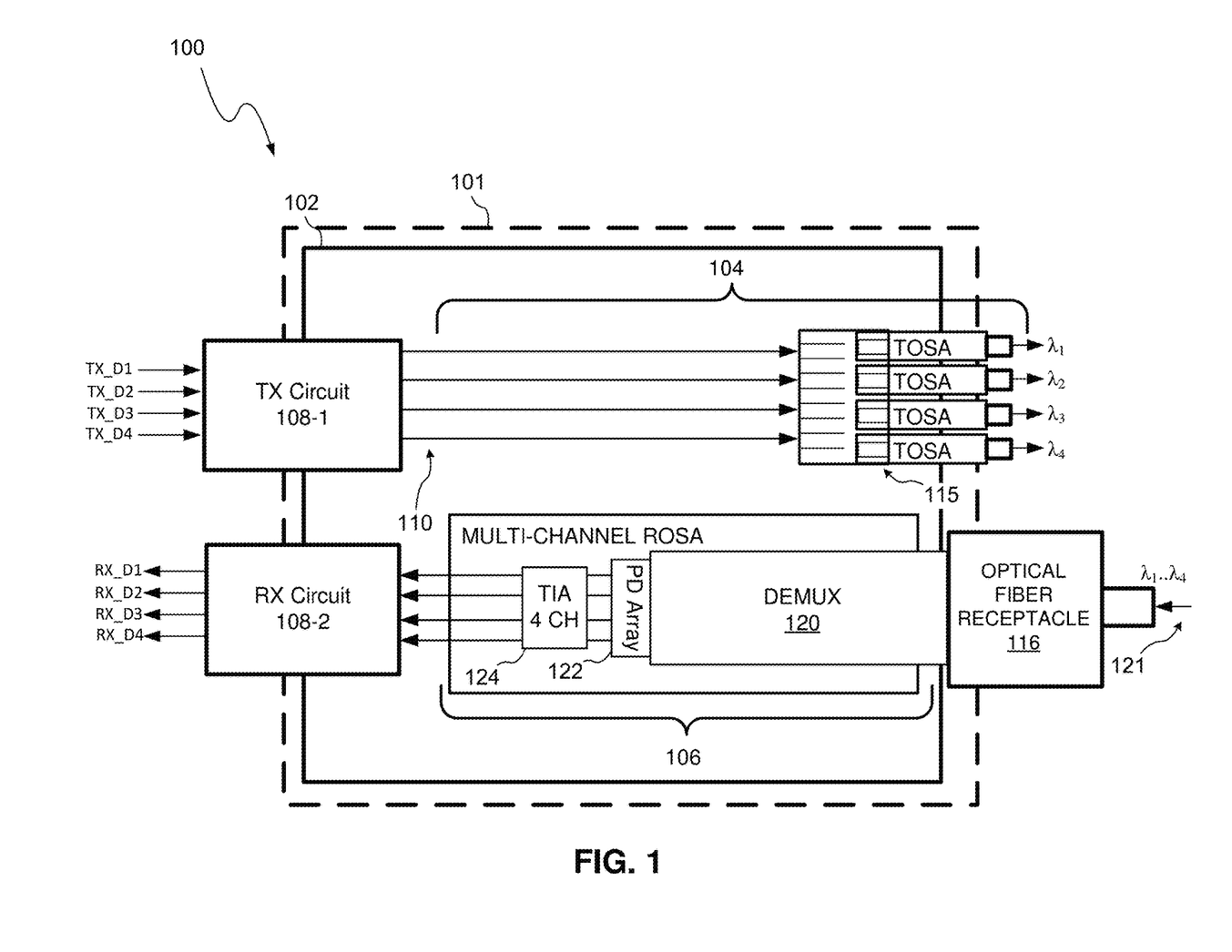
FIG. 1 is a schematic view of an example optical transceiver system consistent with embodiments of the present disclosure.

FIG. 1 shows a block diagram of a multi-channel optical transceiver module 100 consistent with embodiments of the present disclosure. The optical transceiver module 100 includes a housing 101, a substrate 102, a transmitter optical subassembly (TOSA) arrangement 104, and a receiver optical subassembly (ROSA) arrangement 106. The housing 101 can comport with various enclosure standards, and preferably the QSFP-DD standard.

The multi-channel optical transceiver module 100 can transmit and receive at, for instance, 400 Gb/s. The multi-channel optical transceiver module 100 can implement an electrical side of eight (8) lanes of 53.125 Gbps PAM. On the other hand, the optical side can implement four (4) to eight (8) channels while operating on, for instance, 1310 nm, CWDM4 wavelengths, and LAN-WDM wavelengths. The optical transceiver module 100 is capable of transmission distances of up to 10 kilometers, and beyond, depending on an intended application.

The substrate 102 includes a transmit (TX) connecting circuit 108-1 and a receiver (RX) connecting circuit 108-2. The TX connecting circuit 108-1 and RX connecting circuit 108-2 include a plurality of leads printed/disposed on first end of the substrate 102 and can also include additional circuitry such as power converters, rectifiers, and so on. The first end of the substrate 102 at least partially extends from the housing 101 to allow for external circuitry to electrically couple to the TX connecting circuit 108-1 and RX connecting circuit 108-2.

The substrate 102 further includes TX traces 110 with a first end coupled to the TX connecting circuit 108-1 and a second end electrically coupled to the TOSA arrangement 104. The TOSA arrangement can include a plurality of laser arrangements 115 (or TOSA modules). Each laser arrangement of the plurality of laser arrangements 115 includes passive and/or active components such as a laser diode, monitor photodiode, laser diode driving (LDD) chip, optical isolator, and/or focus lens. A optical multiplexer (not shown) can include input ports to receive channel wavelengths from the TOSA arrangement 104 and an output port to output a multiplexed optical having each of the received channel wavelengths. The optical multiplexer may be implemented within the optical transceiver module 100 or provided externally.

The RX connecting circuit 108-2 includes a plurality of traces to electrically couple the multi-channel ROSA arrangement 106 to external receiver circuitry. The multi-channel ROSA arrangement includes an optical demultiplexer 120, a photodiode (PD) array 122, and a transimpedance amplifier 124.

The optical demultiplexer 120 comprises, for example, an arrayed waveguide grating (AWG) or other suitable device. An input of the optical demultiplexer 120 is optically coupled to the RX optical fiber 121 via optical fiber receptacle 116 to receive an RX optical signal having a plurality of channel wavelengths. The input of the optical demultiplexer, and more particularly the body portion adjacent the input, can include a truncated profile provided by at least one truncated corner, as discussed in greater detail below. An output end of the optical demultiplexer 120 outputs separated channel wavelengths on to corresponding photodetectors of the PD array 122. The PD array 122 outputs electrical signals proportional to detected wavelengths. Transimpedance amplifier 124 includes circuitry to amplify and filter signals from the PD array 122.

Figure 2A:
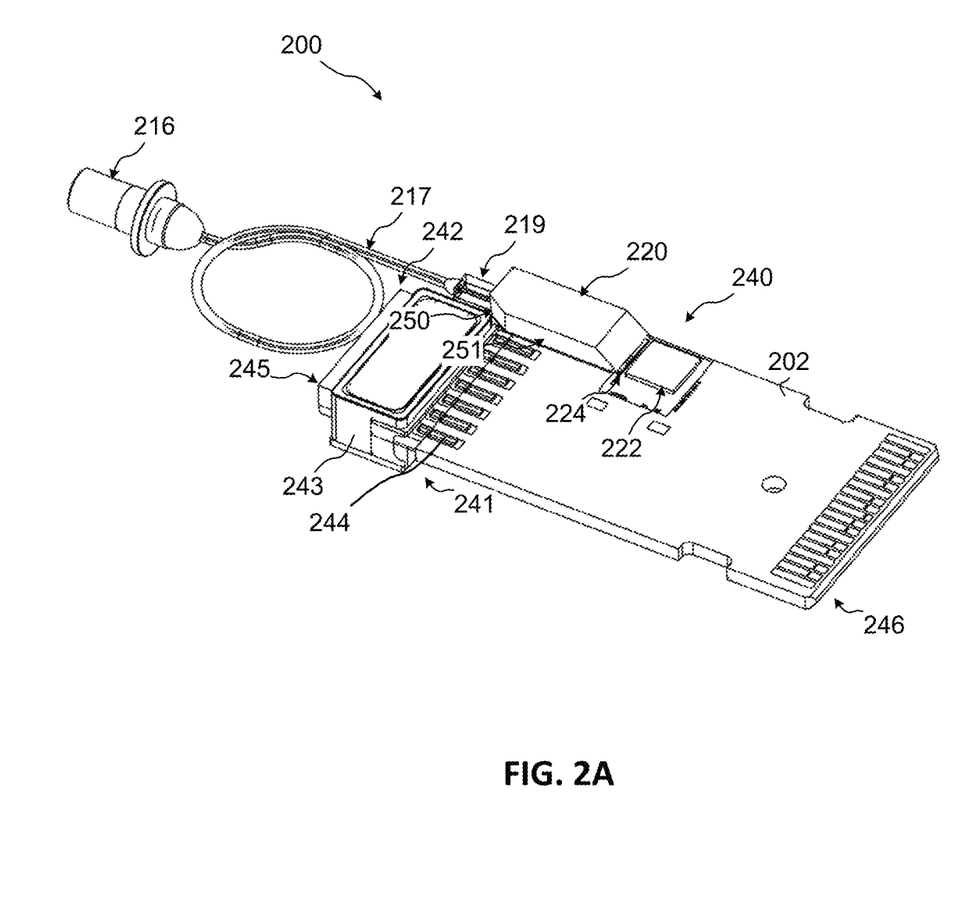
FIG. 2A is a perspective view of a pluggable optical transceiver module implementing the optical transceiver system of FIG. 1 in accordance with an embodiment of the present disclosure.

FIG. 2A shows an example optical transceiver module 200 (referred to herein as simply a transceiver module) consistent with the present disclosure. The optical transceiver module 200 can be implemented within, for instance, a pluggable housing such as a QSFP housing (not shown). The example transceiver module 200 implements the multi-channel optical transceiver module 100 of FIG. 1 in preferably QSFP-DD form factor capable of transmission rates up to 400 Gbp/s, although other form factors are within the scope of this disclosure.

As shown, the example transceiver module 200 includes a substrate 202. The substrate 202 may comprise, for example, a printed circuit board (PCB). A multi-channel ROSA arrangement 240 mounts/couples adjacent a first end 241 of the substrate 202, which may also be referred to as an optical coupling end. The multi-channel ROSA arrangement 240 may also be referred to as an on-board ROSA arrangement.

A multi-channel TOSA arrangement 242 also mounts, e.g., edge mounts, to the first end 241 of the substrate 202. The multi-channel TOSA arrangement 242 can include a housing 243, and in the context of long-distance transmission of up to at least 10 km, the housing 243 includes a plurality of sidewalls to form a hermetically-sealed cavity (not shown). The multi-channel TOSA arrangement 242 includes a plurality of laser arrangements, e.g., TOSA modules 115 of FIG. 1, disposed within the cavity, and a plurality of optical coupling receptacles 245 for launching channel wavelengths.

As further shown, the housing 243 can electrically couple to the substrate 202 via, for instance, bus bars 244 or other suitable interconnect. The bus bars 244 may therefore provide power and RF signals to the TOSA arrangement 242 from transmit circuitry, e.g., TX circuit 108-1 of FIG. 1. As discussed in further detail below, the optical demultiplexer 220 can include a body with one or more truncated corners to provide tolerance/clearance for the bus bars 244 and other surface mounted components, such as shown in the embodiment of FIG. 2A. The substrate 202 also includes a second end 246 which may also be referred to as an electrical coupling end, which can include a plurality of conductive traces to couple to external transmit (TX) and receive (RX) circuitry, e.g., TX and RX circuits 108-1, 108-2 of FIG. 1.

The embodiment of FIG. 2A further shows the multi-channel ROSA arrangement 240 having a transimpedance amplifier (TIA) 222, an array of photodiodes 224, and an optical demultiplexer 220 in an on-board configuration. The array of photodiodes 224 are optically aligned and coupled with an output end of the optical demultiplexer 220 to receive separated channel wavelengths and electrically coupled to the TIA 222 to provide an electrical signal proportional to detected channel wavelengths. The TIA 222 includes amplification circuitry to receive and amplify detected channel wavelengths and can provide the same to associated RX circuitry, e.g., the RX circuit 108-2 of FIG. 1. The optical demultiplexer receives an optical signal having multiple channel wavelengths by way of optical coupling receptacle 216, intermediate optical fiber 217, and input coupler 219. Optical coupling receptacle 216 comprises an LC coupler, as shown, or other suitable coupling receptacle.

The optical demultiplexer 220 is at least partially disposed on the substrate 202 adjacent the optical coupling end. As shown, the truncated corner 250 of the optical demultiplexer 220 allows the same to be disposed in close proximity of the TOSA housing 243. Note, the embodiment of FIG. 2A shows the substrate 202 having a limited number of components/traces for simplicity. Such substrates can include a dense arrangement of components and traces to implement TOSA and ROSA functions. For example, some transceiver substrate implementations utilize up to 95-99% of available surface/mounting area.

Accordingly, the embodiment of FIG. 2A includes the optical demultiplexer 220 utilizing the truncated profile to allow at least a portion of the input region/end of the same to overhang (e.g., extend beyond) the optical coupling end of the substrate while also providing clearance for the TOSA housing 243. As shown, the truncated profile of FIG. 2A gets provided by a tapered region that defines at least a portion of the input end (which may also be referred to as an optical coupling end). At least one mating surface (not shown) of the optical demultiplexer 220 is configured to couple/mount to the substrate 202.

Continuing on, an imaginary line may therefore extend within and along the tangent plane of the surface 251, with surface 251 at least partially defining truncated corner 250, and intersect with the housing 243 when the optical demultiplexer 220 is coupled to the substrate 202. The truncated profile of the optical demultiplexer 220 also allows the same to mount and align with the array of PDs, as shown, without necessarily increasing the width of the substrate 202. Notably, in various applications the width of the substrate must meet specific dimensional requirements, such as those required to meet QSFP-DD standards. In such cases, the width of the substrate is fixed and transceiver designs and implementations must work within those constraints. The optical demultiplexer 220 with the integrated truncated profile enables greater design flexibility within the relatively strict space-constraints imposed by such standards without reducing performance or increasing transceiver complexity.

The embodiment of FIG. 2A illustrates numerous advantageous and features provided by the optical demultiplexer 220 relative to other transceiver module approaches. For instance, the truncated profile of the optical demultiplexer 220 reduces the overall footprint of the same when coupled to the substrate 202, e.g., based on at least a portion of the optical demultiplexer extending beyond the substrate and the remaining portion (e.g., 90-95%) being underlied and supported by the substrate 202. This reduction in footprint, e.g., 1-5% reduction, can provide about 0.2-0.4 square millimeters of additional surface area of the substrate 202 available for mounting traces/components, for example. Other amounts of additional surface area may be achieved, and the specific values provided herein are not intended to be limiting. In any event, the present disclosure has identified that each square millimeter of additional mounting surface area made available by virtue of the truncated profile of the optical demultiplexer 220 significantly simplifies transceiver design, e.g., trace routing, component placement, and so on, and increases design flexibility.

Continuing on, the optical demultiplexer 220 may be configured to demultiplex a signal, e.g., a WDM signal, into individual channel wavelengths. The optical demultiplexer 220 can directly optically couple with the array of photodiodes 224, e.g., via a relatively straight light path without bends/turns and without the use of an intermediate optical waveguide such as an optical fiber. The optical demultiplexing device 220 can be compatible with channel spacing configurations that comport with, for example, 25 nm IEEE LX-4 grids, 20-nm ITU G.694.2 CWDM grids, and a range of ITU G.694.1 DWDM grids in the range of 400 Ghz to 800 Ghz (e.g., 2 nm to 4 nm).

Figure 2B:
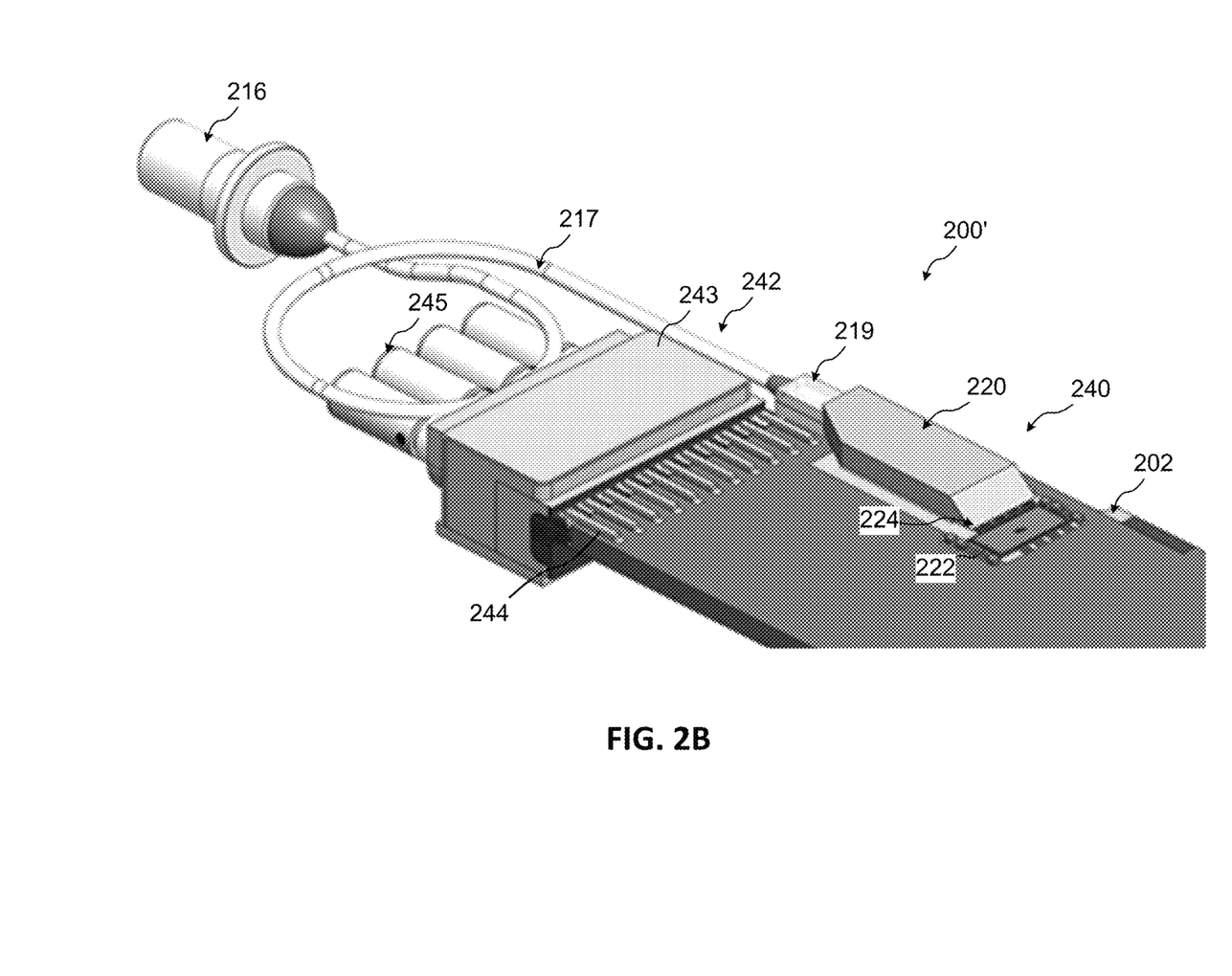
FIG. 2B is a perspective view of another pluggable optical transceiver module implementing the example optical transceiver system of FIG. 1 in accordance with an embodiment of the present disclosure.

FIG. 2B shows an example embodiment of a transceiver module 200'. The embodiment of FIG. 2B is substantially similar to that of the embodiment of FIG. 2A, the description of which will not be repeated for brevity. However, the embodiment of FIG. 2B shows the optical demultiplexer 220 mounted to the substrate in a manner whereby the entire length of the same is underlied and supported by the substrate 202. In this embodiment, the optical demultiplexer 220 allows for mounting of components such as bus bars/terminals in a region/area that would otherwise be occupied by an optical demultiplexer not having a truncated profile. As discussed above, even this relatively small amount of additional space made available by virtue of the truncated profile can significantly simplify design and implementation of transceiver modules.

Figures 3, 4, 5:
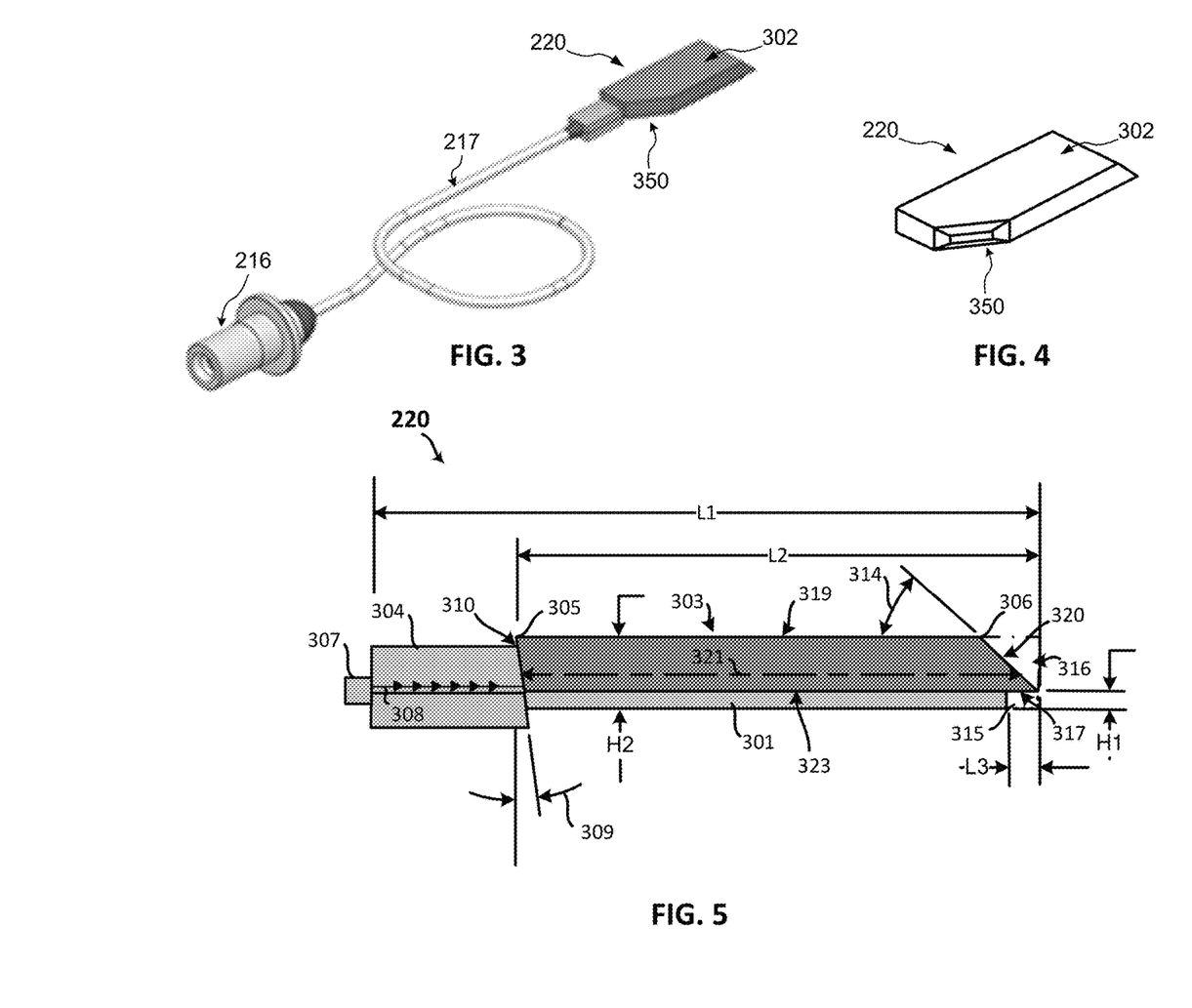
FIG. 3 shows an example optical demultiplexer suitable for use in the pluggable transceivers of FIGS. 2A and 2B, in accordance with an embodiment.
FIG. 4 shows another example optical demultiplexer suitable for use in the pluggable transceivers of FIGS. 2A and 2B, in accordance with an embodiment.
FIG. 5 shows a cross-sectional view of the optical demultiplexer of FIG. 3 in accordance with an embodiment of the present disclosure.

Referring now to FIGS. 3-5, the optical demultiplexer 220 is shown in isolation in accordance with embodiments of the present disclosure. The embodiment of FIGS. 3-5 show the optical demultiplexer 220 implemented as an AWG chip 303, with the AWG chip 303 defining at least a portion of body 302. The AWG chip 303 includes a first end 305 coupled to an input coupling region (or end) 304, and a second end 306 being proximal to a direct coupling interface 317. The input coupling region 304 can include an optical coupling port 307, with the optical coupling port 307 being configured to receive and optically couple to a fiber of the optical coupling receptacle 216, for example.

In general, AWG devices can support both multiplexing and de-multiplexing of optical signals, and thus, the first end 305 is not necessarily an "input" in all applications. However, for the purposes of the aspects and scenarios disclosed herein, the first end 305 is configured to receive an optical signal via fiber 217 and generally launch the same along a longitudinal path indicated by arrows appearing along fiber/waveguide 308 to launch a WDM optical signal into the AWG chip 303. The input coupling region 304 may not necessarily contain a length of fiber and instead comprise, for instance, a cavity or other waveguide structure.

The input coupling region 304 may be coupled to the AWG chip 303 using, for example, an adhesive, although other methods of fixation are within the scope of this disclosure. The input coupling region 304 can include an end with a mounting surface 310 having an angle 309, with angle 309 being about 8 degrees. The angle 309 can reduce back reflection when launching light into the AWG chip 303. To this end, the first end 305 of the AWG chip may also include a mounting surface with an angle of about 8 degrees, thus allowing for proper alignment between a core of the fiber 308 and an input of the AWG chip 303.

The AWG chip 303 can comprise, for example, a planar lightwave circuit (PLC) such as a silica-based planar lightwave PLC device. PLC devices can be fabricated using a wafer process similar to those used for integration of silicon microchips and ICs. Processes for AWG chips can include, for example, forming a circuit pattern using photolithography, etching and deposition and/or epitaxial growth on a substrate, e.g., a silicon or silicon-based substrate. The formed AWG chip 303 can include a cladding material of, for example, silica ($SiO_2$), and a core material of doped silica, or other suitable composition that can provide a contrasting index of refraction for light confinement purposes. The contours of the AWG chip 303 may be defined by the shaping/etching of the silica during formation processes, or by post-processes such as cutting and polishing. Thus the AWG chip 303 can comprise a plurality of sidewalls that are formed from a cladding material layer. However, the AWG chip 303 can include additional protective layers/coatings, such as a metal housing, and is not necessarily limited to the embodiment shown.

Continuing on, the AWG chip 303 includes an output interface 317 (also called a direct coupling interface). As shown, the second end 306 of the AWG chip 303 includes an angled surface 320 that extends from a first sidewall 319 to a second sidewall 323, with the angled surface 320 defining a tapered region of the AWG chip 303.

The angled surface 320 can include an angle 314 relative to longitudinal axis 321, with angle 314 being selected to cause incident light to reflect downwardly at about a 90-degree angle towards the region indicated at 315. Depending on the particular materials used to form the AWG chip 303, and more particularly, their respective index of refraction, the angle 314 can vary. Likewise, the angle 314 may vary within nominal manufacturing tolerances of, for instance, ±2%. In an embodiment, the angle 314 is a range between about 40 degrees to 45 degrees. In some cases, the angled surface 320 and/or truncated corner 350 is provided by cutting, buffing, etching, or otherwise removing a portion of the AWG chip 303. This removed region of the angled surface 320 is generally indicated at 316 for purposes of illustration.

The surface of the second end 306 may be polished to ensure surface-level defects caused by the removal process are removed or otherwise reduced such that a substantial portion, e.g., at least 80%, of light is reflected downwards towards to the region indicated at 315. Formation of the AWG chip 303 can include removing a portion of the substrate generally indicated at 315 to expose the output interface region 317. The exposed output interface region 317 may be polished to ensure a suitable optical coupling.

In an embodiment, the optical demultiplexer 220 can include an overall length L1 of about 13 mm. The AWG chip 303 can include a length L2 of about 10 mm, and a height H2 of about 1.30 mm including the substrate 301, and about 1 mm without. To this end, the substrate 301 can include a height H1 of about 0.3 mm. The region generally indicated at 315, and more particularly the output interface region 317, can include a length L3 of about 0.60 mm.

Returning specifically to FIG. 3, the optical demultiplexer 220 is shown with a body 302 having a substantially rectangular shape with at least one truncated corner 350. The truncated corner 350 gets formed by adding a chamfer by, for instance, removing or otherwise forming the body 302 with a surface/facet instead of a corner, as discussed above. The profile of the truncated corner 350 can comprise other shapes and configurations to provide for additional clearance/tolerance for adjacent optical components. For instance, the embodiment of FIG. 4 shows the body 302 having a truncated corner 350 with a mesa profile/structure. The mesa profile includes a plurality of facets that extend from the body 302 and are adjoined by a top surface. The mesa profile may be particularly well suited for providing clearance/tolerance for adjacent optical components without the necessity of removing a substantial portion of material relative to the chamfer profile shown in FIG. 3.

Accordingly, as generally referred to herein, a truncated corner refers to at least one corner defining the first end 305 (or input end) being removed or otherwise truncated. The truncated corner results in a surface/facet formed in place of the corner (e.g., see the chamfer of FIG. 3) or multiple facets/surfaces in place of the corner (e.g., see the mesa profile of FIG. 4). The truncated corner may not necessarily include truncation/modification of both sides of the body 302. For instance, a truncated corner may include chamfering of a portion of a corner such that the profile of the body when viewed from the top (the surface opposite the output interface, e.g., see FIG. 6) includes a truncated corner, and when viewed from the bottom shows an un-truncated rectangular profile. This configuration may also be referred to as a partially-truncated corner or partially-truncated profile. When forming the partially-truncated corner via material removal, e.g., sheering/cutting, this configuration also advantageously reduces the amount of material to remove.

Figure 6:
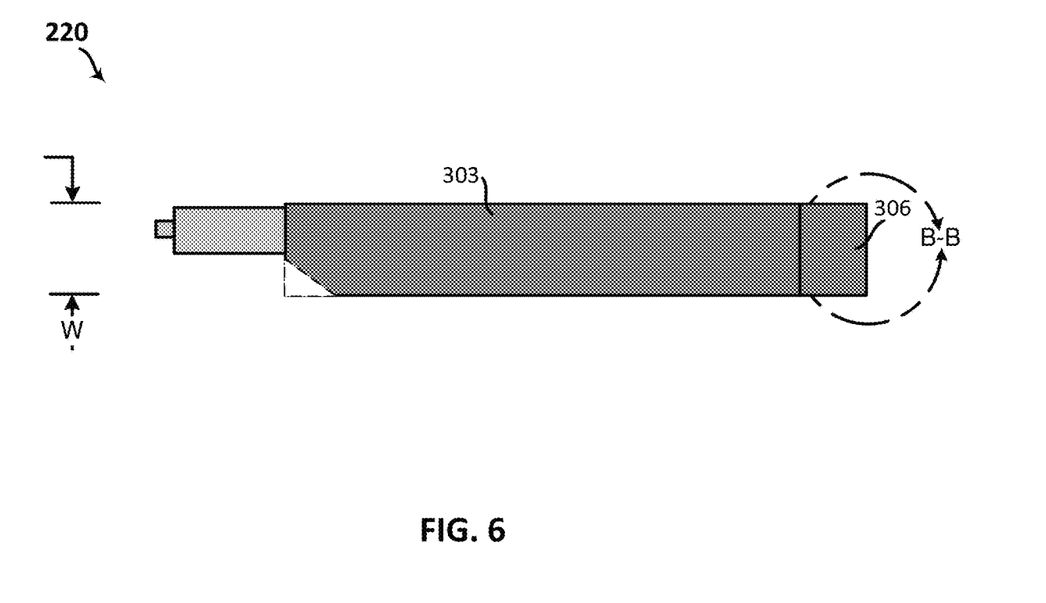
FIG. 6 shows an example top view of the optical demultiplexer of FIG. 3 in accordance with an embodiment.
Figure 7:
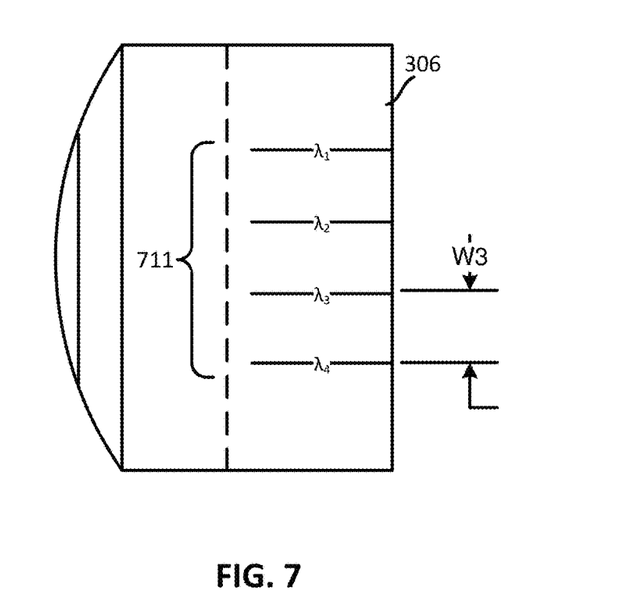
FIG. 7 shows an example cross-sectional view taken along line B-B of FIG. 6, in accordance with an embodiment.

Turning to FIG. 6, a top plan view of the optical demultiplexer 220 is shown, in accordance with an embodiment. As shown, the optical demultiplexer 220 can include a width W of about 1.5 mm. Other configurations are within the scope of this disclosure and the specific examples provided herein should not be construed as limiting. FIG. 7 shows a detail view of a portion of the optical demultiplexer 220 taken along the line B-B, in accordance with an embodiment of the present disclosure. As shown, the output waveguides 711 include a channel spacing W3 of about 0.25 mm, although other channel spacing arrangements are within the scope of this disclosure.

Figure 8:
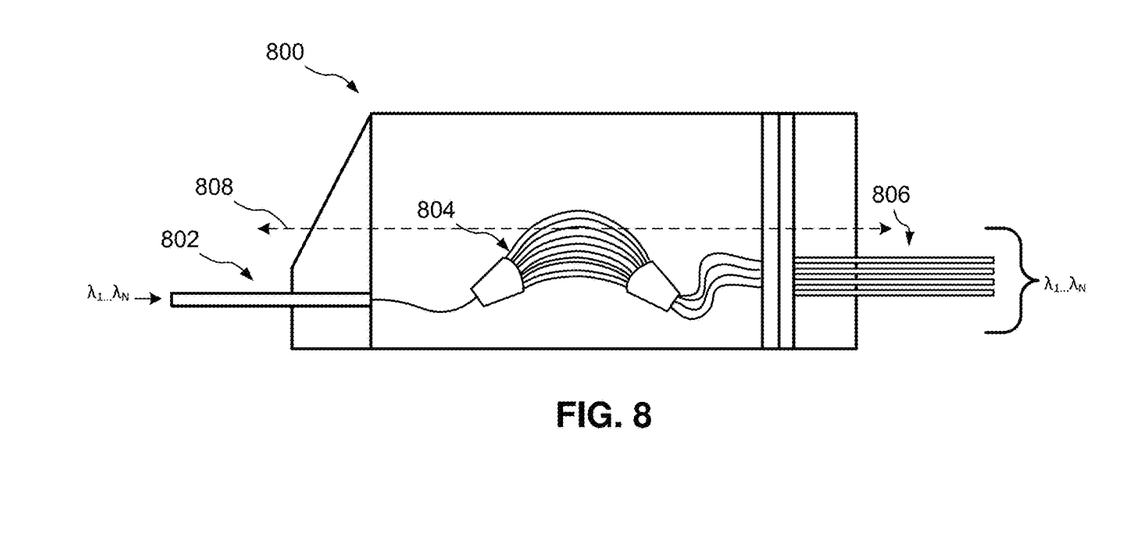
FIG. 8 shows an example optical demultiplexer in accordance with an embodiment.

The present disclosure has further identified that portions of an optical multiplexer, such portions of an AWG chip, can be removed without impacting optical function. In addition, and in accordance with an embodiment, the patterning of waveguides and waveguide gratings may be shifted/offset relative to a center line of the optical multiplexer. For example, as shown in FIG. 8, the optical demultiplexer 800 can include a single truncated corner and an offset waveguide configuration. The offset waveguide configuration can include at least the input waveguide/port 802 and output ports 806 disposed along a common/shared axis which is offset from the longitudinal center line 808 of the body. The waveguide gratings 804 may be optionally patterned with a similar offset, although the position of the waveguide gratings 804 can vary depending on a desired configuration.

Figure 9:
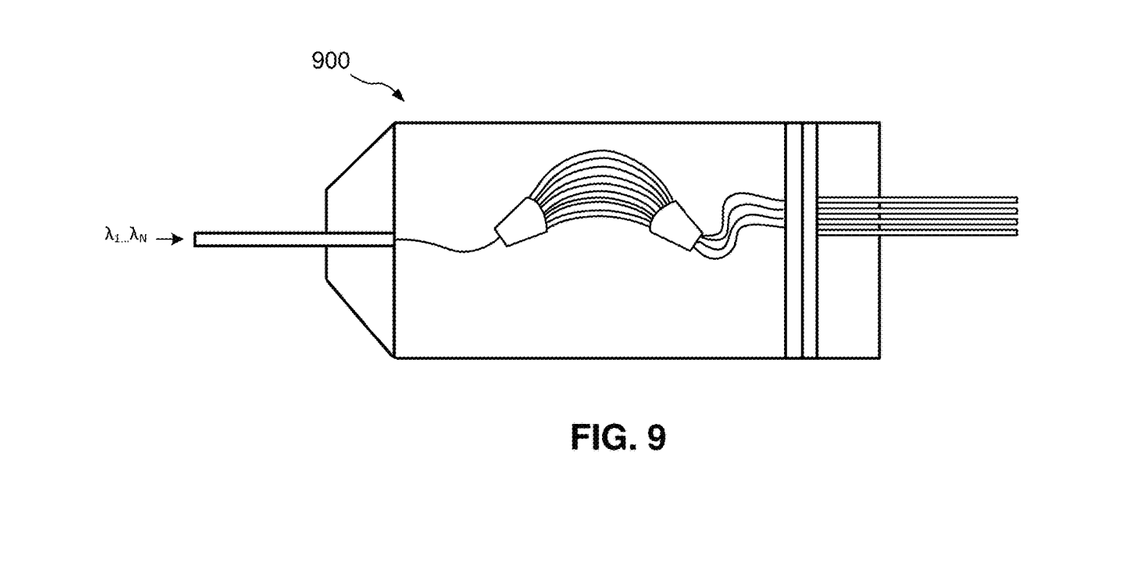
FIG. 9 shows another example optical demultiplexer in accordance with an embodiment.

FIG. 9 shows another example embodiment of an optical multiplexer 900 with a plurality of truncated corners. The embodiment of FIG. 9 can thus provide clearance/tolerance on either side of the body to accommodate adjacent optical components.

In accordance with an aspect of the present disclosure an optical demultiplexer for use in an optical subassembly is disclosed. The optical demultiplexer comprising a body that extends from an input end to an output end and a plurality of waveguides disposed therebetween, a first end of the plurality of waveguides being optically coupled to the input end to receive a multiplexed optical signal and separate channel wavelengths, and a second end optically coupled to the output end to emit separated channel wavelengths from the body, and wherein the body includes a truncated profile to reduce an overall footprint of the optical demultiplexer, the truncated profile defined at least in part by a tapered region at the input end.

In accordance with another aspect of the present disclosure an optical transceiver module is disclosed. The optical transceiver module comprising a transceiver housing, a transceiver substrate disposed in the transceiver housing, a multi-channel receiver optical subassembly (ROSA) arrangement disposed on the substrate and including an arrayed waveguide grating (AWG), the AWG comprising a body that extends from an input end to an output end and a plurality of waveguides disposed therebetween, a first end of the plurality of waveguides being optically coupled to the input end to receive a multiplexed optical signal and separate channel wavelengths, and a second end optically coupled to the output end to emit separated channel wavelengths from the body, and wherein the body includes a truncated profile defined at least in part by a first truncated corner at the input end, a multi-channel transmitter optical subassembly (TOSA) coupled to the transceiver substrate.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical demultiplexer for use in an optical subassembly, the optical demultiplexer comprising:
   a body that extends from an input end to an output end along a longitudinal axis, wherein the body is formed as a monolithic structure;
   a plurality of waveguides patterned on the body, wherein a first end of the plurality of waveguides is optically coupled to the input end to receive a multiplexed optical signal and separate channel wavelengths, and a second end of the plurality of waveguides is optically coupled to the output end to emit separated channel wavelengths from the body;
   wherein the body includes a substantially uniform width W along the longitudinal axis from the output end of the body to a tapered region at the input end, the tapered region having a width less than the substantially uniform width W to provide a truncated profile defined at least in part by a truncated corner at the input end to reduce an overall footprint of the optical demultiplexer, wherein the truncated corner is located on a portion of the input end without the first end of the plurality of waveguides such that the truncated corner provides space for other components in the optical subassembly, which are not connected to the body of the optical multiplexer; and
   wherein the body further comprises an angled surface disposed at the output end, the angled surface configured to receive light via the plurality of waveguides and reflect the same towards an output interface.

2. The optical demultiplexer of claim 1, wherein the optical demultiplexer comprises an arrayed waveguide grating (AWG) chip, and wherein the tapered region is defined at least in part by sidewalls of the AWG chip.

3. The optical demultiplexer of claim 1, wherein the tapered region is provided by a chamfer.

4. The optical demultiplexer of claim 1, wherein the tapered region is provided by at least two truncated corners.

5. The optical demultiplexer of claim 1, wherein the tapered region of the truncated profile is provided to accommodate adjacent optical components when the optical demultiplexer is coupled to a transceiver substrate.

6. The optical demultiplexer of claim 1, wherein the truncated profile includes a mesa structure formed in place of a corner at the input end, the mesa structure including a plurality of surfaces extending from the body and adjoined by a top surface.

7. The optical demultiplexer of claim 1, wherein the substantially uniform width W of the body is 1.5 millimeters.

8. An optical transceiver module, the optical transceiver module comprising:
   a transceiver housing;
   a transceiver substrate disposed in the transceiver housing;
   a multi-channel receiver optical subassembly (ROSA) arrangement disposed on the substrate and including an arrayed waveguide grating (AWG), the AWG comprising:
      a body that extends from an input end to an output end along a longitudinal axis;
      a plurality of waveguides disposed between the input end and the output end, wherein a first end of the plurality of waveguides is optically coupled to the input end to receive a multiplexed optical signal and separate channel wavelengths, and a second end of the plurality of waveguides is optically coupled to the output end to emit separated channel wavelengths from the body;
      wherein the body includes a substantially uniform width W along the longitudinal axis from the output end of the body to a tapered region at the input end, the tapered region having a width less than the substantially uniform width W to provide a truncated profile defined at least in part by a first truncated corner at the input end, wherein the body of the AWG is disposed on the transceiver substrate such that the truncated corner makes a space available on the transceiver substrate; and
      wherein the body further comprises an angled surface disposed at the output end configured to receive light via the plurality of waveguides and reflect the same towards the array of photodiodes;
   a multi-channel transmitter optical subassembly (TOSA) coupled to the transceiver substrate; and
   a component disposed on the transceiver substrate and positioned in close proximity to the AWG with at least a portion of the component located in the space made available on the transceiver substrate by the truncated corner of the body of the AWG, and wherein the component is not connected to the AWG.

9. The optical transceiver module of claim 8, wherein the first truncated corner is defined by a chamfer.

10. The optical transceiver module of claim 8, wherein the multi-channel TOSA includes a housing defining a hermetically-sealed cavity.

11. The optical transceiver of claim 10, wherein the first truncated corner is defined at least in part by a sidewall of the body, and wherein an imaginary line drawn along and within a tangent plane of the sidewall intersects with the housing of the TOSA.

12. The optical transceiver module of claim 8, wherein at least a portion of the input end of the body extends beyond the substrate and a remainder of the body is underlied and supported by the transceiver substrate.

13. The optical transceiver module of claim 8, wherein the truncated profile is defined by the first truncated corner and a second truncated corner.

14. The optical transceiver module of claim 8, wherein the multi-channel ROSA further comprises an array of photodiodes disposed on the transceiver substrate.

15. The optical transceiver module of claim 8, wherein an imaginary line drawn along and within a tangent plane of a sidewall defining the truncated corner intersects with a housing of the multi-channel TOSA.

16. The optical transceiver of claim 8, wherein the component is the TOSA disposed on the transceiver substrate.

17. The optical transceiver of claim 8, wherein the component is at least one bus bar or terminal disposed on the transceiver substrate.

18. The optical transceiver of claim 8, wherein the truncated corner is located on a portion of the input end without the first end of the plurality of waveguides.

* * * * *